(12) United States Patent
Austin et al.

(10) Patent No.: US 6,578,123 B1
(45) Date of Patent: Jun. 10, 2003

(54) RELOCATABLE OVERLAND PERIPHERAL PAGING

(75) Inventors: Charles C. Austin, Mission Viejo, CA (US); Kevin Feshangchi, Mission Viejo, CA (US); Jeff Harth, Tustin, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/978,169

(22) Filed: Nov. 25, 1997

Related U.S. Application Data (63) Continuation of application No. 08/422,037, filed on Apr. 14, 1995, now abandoned.

(51) Int. Cl.[7] .............................................. G06F 12/00
(52) U.S. Cl. .................. 711/165; 711/166; 711/171; 711/173
(58) Field of Search ................................. 711/165, 166, 711/171, 173

(56) References Cited

U.S. PATENT DOCUMENTS

| | | | | |
|---|---|---|---|---|
| 4,528,644 A | * | 7/1985 | Soderberg et al. | 364/900 |
| 4,875,155 A | * | 10/1989 | Iskiyan et al. | 395/440 |
| 5,522,076 A | * | 5/1996 | Dewa et al. | 395/700 |
| 5,535,417 A | * | 7/1996 | Baji et al. | 395/842 |

OTHER PUBLICATIONS

"Expanded Memory: Writing Programs that Break the 640K Barrier" Hansen et al., pp 21–32, Mar. 1987.*
"Understanding Expanded Memory Systems" by Duncan, pp 535–562, 1986.*

* cited by examiner

Primary Examiner—Reba I. Elmore
(74) Attorney, Agent, or Firm—W. Daniel Swayze, Jr.; W. James Brady; Frederick J. Telecky, Jr.

(57) ABSTRACT

Apparatus for flexibly locating the data page on which the peripheral registers are located. External hardware contentions are eliminated because the peripheral registers can be relocated anywhere in the system address space. Hardware design is therefore much more flexible. Further, because the present invention allows peripheral registers to overlay internal data memory, data transfers can be carried out between data and peripherals using the same data page pointer. No intermediate pointer loading operations are required and memory operations to the peripheral registers can be carried out at maximum speed. The present invention allows peripheral registers to overlay data memory in a manner that permits the overlaid memory to be recovered and used for other purposes. Processor program code can be designed to overlay internal data memory with the peripheral registers while performing data transfers between the data memory and the peripheral registers. The overlaid data memory is not accessible while it is overlaid. Then, after completing transfers, the peripheral registers can be relocated elsewhere so that the underlying internal data memory is recovered. The underlying data memory is not disturbed when writing to the overlaying peripheral registers.

19 Claims, 6 Drawing Sheets

| Address - NAME | bit 15 | bit 14 | bit 13 | bit 12 | bit 11 | bit 10 | bit 9 | bit 8 | bit 7 | bit 6 | bit 5 | bit 4 | bit 3 | bit 2 | bit 1 | bit 0 |
|---|---|---|---|---|---|---|---|---|---|---|---|---|---|---|---|---|
| 0 SERVO CONTROL | FIFO MODE | DAC WRITE MODE | ADC3 DONE | ADC2 DONE | ADC1 DONE | ADC0 DONE | ADC MODE 3 | ADC MODE 2 | ADC MODE 1 | MARGIN | DAC2 VREF | RETRACT | SAT | VCM ENABL | ADC START | ADC BUSY |
| 1 ADC0/4 | BIT 9 | | | | ADC0/ADC4/DAC1 | | | | BIT 0 | | | | | | | |
| 2 ADC1/5 | BIT 9 | | | | ADC1/ADC5/DAC2 | | | | BIT 0 | | | | | | | |
| 3 ADC2/VBG | BIT 9 | | | | ADC2/VREF | | | | BIT 0 | | | | | | | |
| 4 ADC3 | BIT 9 | | | | ADC3 | | | | BIT 0 | | | | | | | |
| 5 SOUT | BIT 9 | | | | SOUT | | | | BIT 0 | | | | | | | |
| 6 DAC1 | BIT 9 SIGN | | | | DAC1 | | | | BIT 0 | | | | | | | |
| 7 DAC2 | BIT 9 SIGN | | | | DAC2 | | | | BIT 0 | | | | | | | |
| 8 CLOCK CONTROL | | | | | | | | SLEEP 1 | SLEEP 0 | PCLK DIV 3 | PCLK DIV 2 | PCLK DIV 1 | PCLK DIV 0 | CNTR3 FLAG | CNTR2 FLAG | CNTR1 FLAG |
| 9 TEST | BIT 15 | | | | | | | TEST WORD | | | | | | | | BIT 0 |
| A SPIN. CONTROL | SPMUX MODE1 | SPMUX MODE0 | SPCNTR MODE1 | SPCNTR MODE0 | SPDIV MODE3 | SPDIV MODE2 | SPDIV MODE1 | SPDIV MODE0 | SPCLK SEL3 | SPCLK SEL2 | SPCLK SEL1 | SP. RESET | ENABLE | DIS. PWR | GAIN | ADVANCE |
| B SPDAC | 0 | BIT 11 MSB | | | | | SPINDLE DAC | | | | | | BIT 0 LSB | | | |
| C SPIN. COUNT1 | 0 | BIT 14 | | | | | | SPINDLE COUNTER 1 | | | | | | | | BIT 0 |
| D SPIN. COUNT2 | 0 | BIT 14 | | | | | | SPINDLE COUNTER 2 | | | | | | | | BIT 0 |
| E SPIN. COUNT3 | BIT 15 SIGN | | | | | | | SPINDLE COUNTER 3 | | | | | | | | BIT 0 |
| F SPCNT3 PRESET | BIT 15 SIGN | | | | | | | SPINDLE COUNTER 3 PRE-LOAD | | | | | | | | BIT 0 |

RELOCATABLE OVERLAND PERIPHERAL PAGING

This application is a Continuation, of application Ser. No. 08/422,037 filed on Apr. 14, 1995 now abandoned.

BACKGROUND OF THE INVENTION

1. Field of the Invention

This invention relates to the field of microprocessor-based processing systems, and, in particular, to paged data addressing methods.

2. Background Art

In microprocessor-based systems, a processor such as a central processing unit (CPU) of a personal computer, or a digital signal processor (DSP) used in more application specific systems, manipulates data based on coded instructions. The utility of the processor is dependent on the instruction set of the processor, i.e., those basic functions built into the processor architecture that are controlled by microcode. In order to increase the utility of a system, further functionality may be provided by the addition of peripherals.

Peripherals are devices that provide special purpose functions. Some examples of peripherals are analog-to-digital (ADC) and digital-to-analog (DAC) converters, control and status registers, and special purpose logic. Peripherals are typically accessed through registers. The processor accesses the peripheral registers like other locations within the system address space by specifying an appropriate address on an address bus, then reading or writing to the register through a data bus. The peripheral devices read and write to the respective peripheral registers continuously.

The addressing scheme of a processor-based system must accommodate the peripheral registers and all other addressable entities, such as data memory. However, a fixed address for peripheral registers places unwanted constraints on the system. External devices such as RAM and digital ASICs must work around the assigned and fixed address space of the peripheral registers. Alternative addressing methods are therefore desired.

Memory mapping is one method for modifying the way that a processor accesses memory. Techniques used for memory mapping in the prior art include memory management, expanded memory or memory banking, changeable configuration jumpers on adapters, and programmable hardware address decoding.

Memory management is a technique that involves assigning blocks of memory to different tasks running on the same computer. Hardware used for memory management can exist separately or may be present in the processor itself, as in the Intel® 80386 microprocessor. Memory management allows each application program to run in a virtual machine where memory is transparently mapped from unique physical addresses to virtual logical addresses, hiding the fact that other application programs exist.

Expanded memory or memory banking is a technique used with processors able to address only a limited address space. In the banking scheme, more memory is provided than the processor can physically address. Physical memory banks are enabled and disabled individually as needed using special "bank select" hardware, thereby expanding the usable memory range.

Configuration jumpers, used frequently in personal computers, are hardware connectors that set up an I/O card to have a particular address space and respond to a particular set of control signals. Setting the jumpers is strictly a one-time operation, providing little addressing flexibility for the system once the setting operation is performed.

While examples of random access memory mapping exist in the prior art, peripheral hardware mapping exists in only a limited form. In one example, a series of AT controllers developed by Adaptec use one control bit to locate the address space of a device at one of two possible locations so that the device does not conflict with the address range of a second device. The control bit is intended to be set only once at initialization, and it is not possible to share data memory or alter the address setting thereafter.

Industry standard digital signal processors use paged data addressing methods. Paged data addressing relies upon a separate data page pointer to point to the currently accessible data memory page. The DSP can then access words within the page using a reduced address word. For instance, in a 64 k address space with a 128-word page size, the DSP can address the contents of the page with a smaller seven-bit address word rather than the complete sixteen-bit address word. The data page pointer provides the other nine bits of address information. This enables the processor to specify the seven-bit address within a sixteen-bit microinstruction word. The alternative requires that a microinstruction reserve a second word in program memory for every address related instruction to hold the complete sixteen-bit address.

Prior art methods of attaching peripherals to processors, including paged DSPs, consist of assigning a specific address to each peripheral. Access to the peripheral is always through the fixed address. The peripheral address can be in I/O or data memory space within the processor's address space. However, I/O space is usually supported with simple instructions such as IN or OUT, whereas data memory space is supported by a rich set of instructions. In a paged data memory DSP system, data memory space is typically the most powerful from an instruction viewpoint.

Figure 1:
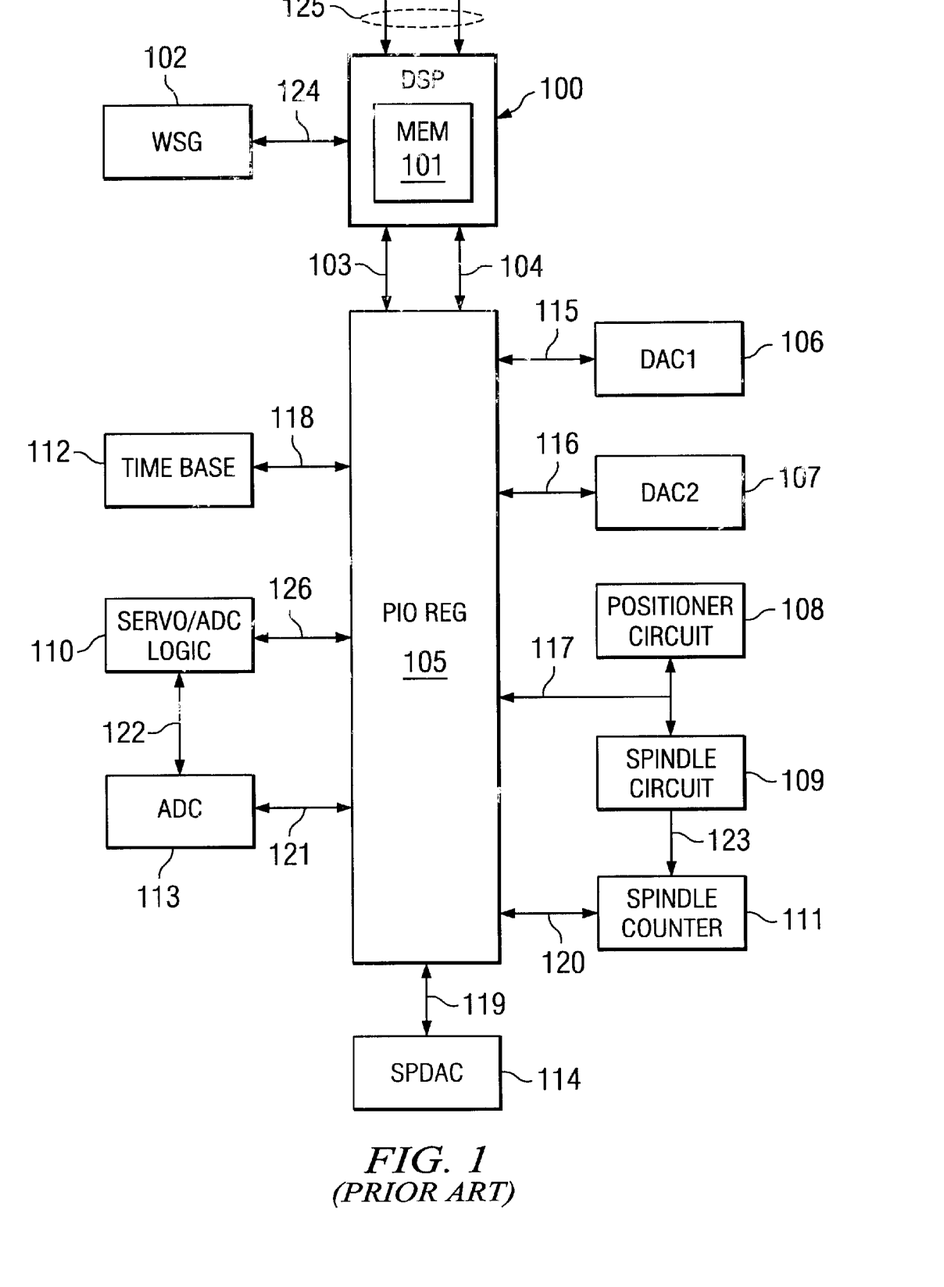
FIG. 1 is a circuit block diagram of a DSP-based servo predriver circuit with a peripheral register block and associated peripherals.

FIG. 1 shows an example of a DSP-based servo predriver system with a peripheral register block and associated peripherals. The servo predriver system is used to control a voice coil motor for positioning an actuator arm and a spindle motor of a disk drive. In FIG. 1, digital signal processor 100 contains arithmetic logic units (ALUs) and other logic for manipulating and transferring data in the system. Also included within the processor is a block of internal memory 101, typically random access memory (RAM). This internal memory is separated into program memory and data memory, though this separation may be conceptual only. Also, the program memory may be implemented with programmable read-only memory (PROM) rather than RAM, in which case the microcode stored in program memory would be referred to as firmware, as opposed to software. The program memory stores the microcode instructions of the program controlling the operation of the processor, whereas the data memory provides storage for firmware or software variables and data the DSP is processing. For this example, the DSP contains 1,024 words of internal program memory and 544 words of internal data memory.

The address bus is sixteen bits wide to provide an address space of 64 k unique addresses. In this paged addressing system, the address space is separated into 512 data pages containing 128 unique addresses apiece. Thus, the nine most significant bits of the sixteen-bit address are determined by the chosen data page, and the seven least significant bits determine the chosen address within the data page. The data bus is also sixteen bits wide. The nine-bit data page value is stored in a data page register in memory as a pointer to the current data page. Microcode instructions enable the DSP to write data page pointer values to the data page register and thus change the current data page.

Address, control and data busses 125 are provided from DSP 100 for attachment of external devices such as external memory and I/O devices. The external devices are assigned addresses within the 64 k address space for paged access by the DSP. Wait state generator (WSG) 102 is coupled to DSP 100 via bus 124. Peripheral I/O register (PIO REG) 105 is coupled to DSP 100 through address bus 103 and data bus 104. Digital-to-analog converters 106 and 107 (DAC1 and DAC2) are coupled to PIO REG 105 through busses 115 and 116, respectively. Positioner circuit 108 and spindle circuit 109 are coupled to PIO REG 105 via bus 117. Spindle counter 111 and analog-to-digital converter 113 are coupled to PIO REG 105 through busses 120 and 121 respectively. Time base generator 112 and spindle DAC 114 (SPDAC) are coupled to PIO REG 105 via busses 118 and 119, respectively. Spindle counter 111 is coupled to spindle circuit 109 via bus 123. Servo/ADC logic 110 is coupled to PIO REG 105 through bus 126 and to ADC 113 through bus 122.

DSP 100 communicates with the peripherals through PIO REG 105. PIO REG 105 consists of a block of sixteen registers in this example, all mapped to interface with the peripherals of the system. These registers are continuously accessible by the peripherals, but are typically only accessed by the processor according to instructions in the microcode.

Time Base circuit 112 is provided for the generation of clock signals. A clock signal for the peripheral circuits is generated by dividing an externally supplied high frequency clock signal by a four-bit value stored in a clock control register within PIO REG 105.

WSG 102 simplifies the attachment of external program and data memory to the processing system. The processor's memory space is separated into segments, each of which is assigned a wait state value. I/O space may be similarly assigned wait state values. Wait states are useful when the speed of the processor exceeds the access speed of the memory or I/O device the processor is trying to read or write. The processor cycles through the assigned number of wait states while the memory or device completes its relatively slower operation. The assigned wait state values may be stored as a wait state code in a wait state register within the internal memory of DSP 100.

In this example, there are several registers within PIO REG 105 for holding the ten-bit result of two's complement ADC conversions from ADC 113. In a typical servo predriver application, ADC 113 receives position bursts from a servo demodulator and a voice coil motor current value (SOUT) sensed from a small resistor placed in series with the voice coil motor, in one example performing five conversions corresponding to four position bursts and one voice coil motor current value. ADC status bits in PIO REG 105 are polled to test conversion progress or, alternatively, a conversion complete interrupt may be used to notify the DSP that data is available.

The Servo/ADC Logic 110 controls the operation of ADC 113 according to ADC mode control bits stored in a servo control register within PIO REG 105. The different modes of the ADC operation differ in the method of starting the ADC conversion, the number of conversions performed, and the input source. For the example of FIG. 1, the selectable input sources are ADC0, ADC1, ADC2, ADC3, ADC4, ADC5, SOUT and VREF. VREF is a bandgap reference voltage provided by a reference circuit, and used as a voltage reference in other circuits such as Positioner Circuit 108. Table 1 lists the ADC conversion modes of this example.

DAC1 106 and DAC2 107 are two's complement ten-bit voltage DACs for providing analog outputs to the servo predriver system based on the digital input received from DSP 100 via PIO REG 105. DAC2 is equipped with a switch for selecting from two reference voltage signals. A control bit within PIO REG 105 determines which signal is selected. In addition, for spindle motor current control, a twelve-bit pulse density DAC, SPDAC 114, provides an analog output signal based on a digital value passed through PIO REG 105 from DSP 100. The analog output (not shown) is provided to spindle circuit 109 to set the maximum spindle current.

TABLE 1

| Mode | ADC Mode Control Bits | | | Operation |
|---|---|---|---|---|
| normal | 0 | 0 | 0 | An externally provided start signal is asserted and each pulse of an externally provided strobe signal initiates the conversion of one of inputs ADC0–ADC3, in sequence. After the start signal is de-asserted, input SOUT is converted. There may be up to four strobe signal pulses during the start interval depending on the number of position bursts utilized. |
| normal-auto | 0 | 0 | 1 | After assertion of the external start signal, a single pulse of the strobe signal initiates the sequential conversion of inputs ADC0–ADC3 and SOUT. SOUT is converted on the falling edge of the external start signal after any active conversion is complete. |
| direct ADC0 | 0 | 1 | 0 | This mode allows direct external control to convert input ADC0 for use with external sample-and-hold and mux circuits. The input is converted upon assertion of the external strobe signal. |
| direct ADC4 | 0 | 1 | 1 | This mode allows direct external control to convert input ADC4, via the external strobe signal, for use with external level conditioning and sampling circuits. |
| external calibrate | 1 | 0 | 0 | Inputs ADC4–ADC5, SOUT and VREF are converted under DSP control by asserting the ADC START bit in the PIO register. |
| manual conversion | 1 | 0 | 1 | Inputs ADC0–ADC3 are converted under DSP control by asserting the ADC START bit. |
| SOUT conversion | 1 | 1 | 0 | DSP initiates a conversion of SOUT by asserting the ADC START bit. |
| internal calibrate | 1 | 1 | 1 | The DSP initiates a sequence of conversions by setting the ADC START bit. The outputs of DAC1 and DAC2, as well as internal VREF and SOUT signals, are converted and loaded into the PIO registers. |

Spindle circuit 109 includes a spindle motor current waveform generator, a phase error circuit and phase locked loop, MOSFET predrivers, and a delayed spindle brake circuit. The waveform generator drives the spindle motor windings with properly phased current waveforms. In run mode, the generator is clocked by the VCO output within the phase locked loop. During start mode, the generator is clocked by the ADVANCE bit in the spindle control register within PIO REG 105. As stated above, the output from SPDAC 114 controls the peak amplitude of the current waveform. A GAIN bit in PIO REG 105 is used to select between two possible peak current values corresponding to two peak voltage values across the sense resistors of each branch.

Spindle Counter 111 includes three counters for providing spindle speed and phase control. A first counter (spindle counter 1) is dedicated to measuring the period of a local spindle. Spindle mode bits within PIO REG 105 a reprogrammed so that the measurement period is based on the commutation of the spindle motor itself, as detected from the spindle VCO within Spindle Circuit 109, or from an external source.

Synchronized dual-spindle operation is supported with a master spindle counter (spindle counter 2) and a relative phase counter (spindle counter 3). The master spindle counter measures the period of the master spindle. The relative phase counter is started by the master spindle index pulse and stopped by the local spindle index pulse to generate a phase measurement. To assist in measuring phase for all angles, the relative phase counter can be preloaded with a number such that a two's complement value centered at zero corresponds to the desired phase. Counter values are written to respective registers within PIO REG 105. Counter flag bits within PIO REG 105 are enabled to indicate to the DSP that a new counter value has been written to the respective register in PIO REG 105.

Spindle motor startup is implemented by the DSP. The DSP asserts an ADVANCE bit in the spindle control register within PIO REG 105, which in turn advances the spindle commutation counter a fraction of a commutation. During startup, the DSP provides an increasing frequency of ADVANCE pulses to accelerate the motor. When the motor has reached sufficent speed, the DSP enables normal mode via an ENABLE bit in the spindle control register and Spindle Circuit 109 assumes control of commutation.

Positioner Circuit 108 is an actuator predriver including amplifiers, a saturation detector, and crossover protection. The actuator predriver serves as a transconductance amplifier by driving four external MOSFETs in an H-bridge configuration. Class B operation is ensured by crossover protection circuitry between the amplifier outputs and the external MOSFETs, permitting only one MOSFET at a time in each leg of the H-bridge to be conducting. The crossover protection circuitry also applies a constant voltage across the voice-coil motor to retract the actuator arm at a constant velocity when the RETRACT bit in PIO REG 105 is set.

Figure 5:
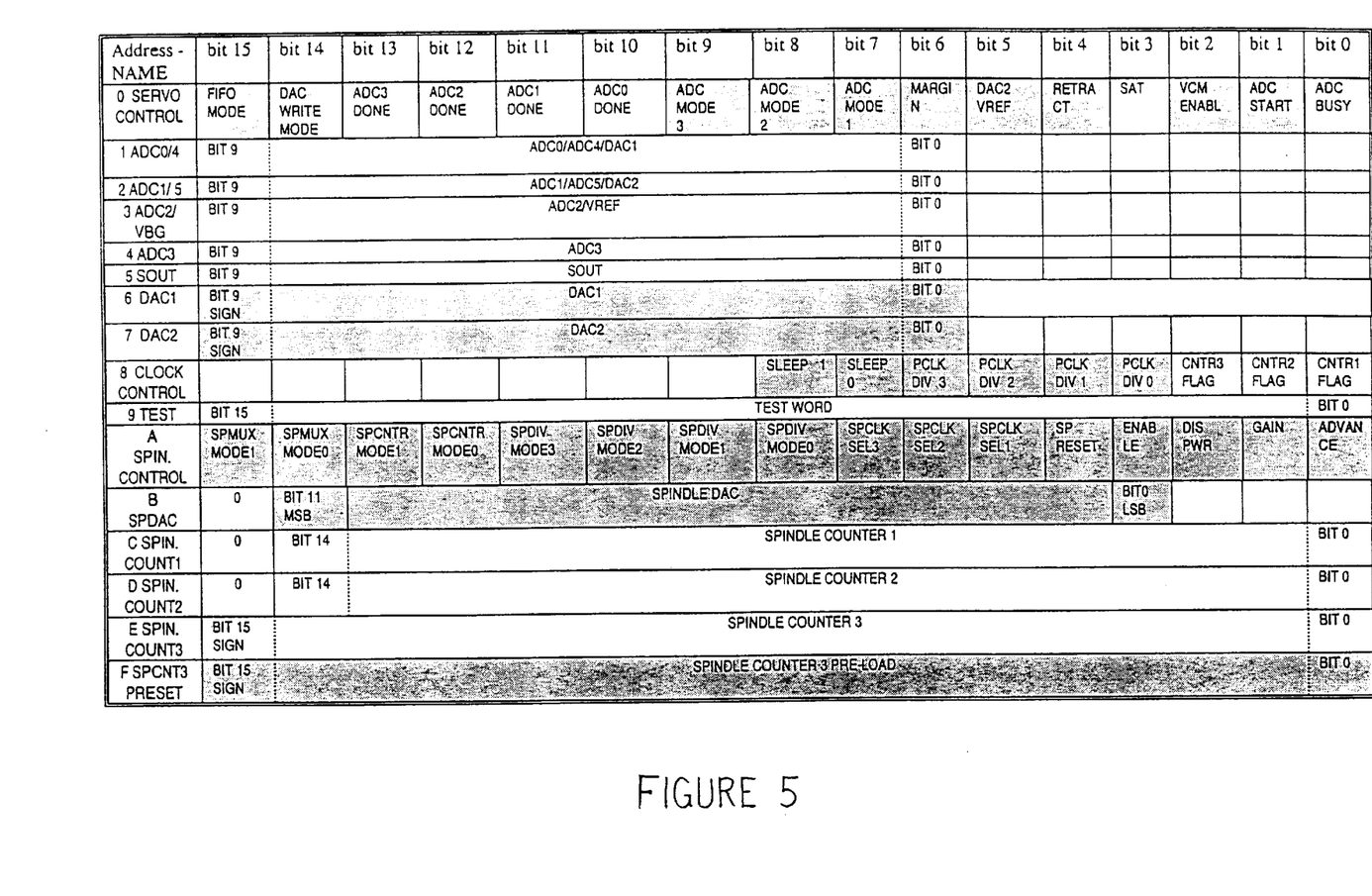
FIG. 5 is a peripheral I/O register map for the peripheral register block of FIG. 1.

FIG. 5 is a peripheral I/O register map for PIO REG 105 of the example discussed above. Registers are labeled in the leftmost column in hexadecimal format from 0–9 and A–F. The register bits are specified by column from left to right with bit 15 on the left and bit 0 on the right.

Register 0 is the servo control register. In bit position 15, the FIFOMODE bit is used to alter the functionality of register 6. When the FIFOMODE bit is set high, register 6 is configured as a four word first-in first-out (FIFO) register. The DSP can write successive values into the FIFO (register 6), and the FIFO is read out to the DACs sequentially when triggered by an externally provided DACUPDATE signal.

The DACWRITEMODE bit in position 14 of register 0 controls the operation of DAC1 and DAC2. When the DACWRITEMODE bit is not asserted, the upper ten bits of data in registers 6 and 7 are converted by DAC1 and DAC2 respectively. When the DACWRITEMODE bit is asserted, the entire 16-bit word in register 6 is sent to DAC1 and DAC2 in the following manner: bit 15 is the sign bit for both DACs, bits 14–6 are sent to DAC1, bits 5–0 are sent to DAC2 as bit values 8–3 of the DAC word, and bit values 2–0 of the DAC word for DAC2 are written as 1-0-0 respectively.

Bit positions 13–10 of register 0 are used by the Servo/ADC Logic 110 to indicate when ADC conversions are complete for four of the five possible conversions in a typical cycle. Each bit indicates status for a separate conversion operation. Bit positions 9–7 store the ADC mode as outlined in Table 1. Bit position 6, labeled MARGIN, is used by a fault detection block (not shown) to alter the fault detection thresholds for the purpose of system margin testing. Bit position 5 is used to select between two reference voltages provided to DAC2, VREF provided internally and DAC2REF provided externally. Bit position 4 is used by the DSP to assert RETRACT mode for the Positioner Circuit 108. Bit position 3 is asserted by the Positioner Circuit 108 when saturation is detected in the current sense amplifier. Bit position 2 is used to enable the voice-coil motor circuitry of Positioner Circuit 108. Bit position 1 is used for DSP control of the start of ADC conversions in ADC 113. Bit position 0 is a status bit for indicating when ADC 113 is busy with a conversion operation.

Register 1, labeled ADC0/4, stores the conversion values for ADC 113 of two analog inputs, ADC0 and ADC4. Register 1 stores the conversion value from DAC1 when ADC 113 is in internal calibration mode. Register 2, labeled ADC1/5, similarly stores conversion values for ADC 113 from two analog inputs, namely ADC1 and ADC5, as well as the conversion value from DAC2 when in internal calibration mode. Register 3, labeled ADC2/VBG, stores the conversion value of analog input ADC2, and a conversion value of the internal bandgap reference voltage input VREF from ADC 113. Registers 4 and 5, labeled ADC3 and SOUT respectively, store the conversion values for analog inputs ADC3 and spindle current sense value SOUT for ADC 113. The DSP writes the digital input conversion values for DAC1 and DAC2 into registers 6 and 7, respectively, subject to FIFOMODE and DACWRITEMODE bits described above. All of the above ten-bit conversion values for registers 1–7 are stored in register bits 6–15, with the most significant bit in bit position 15.

Register 8 stores sleep control bits in positions 7 and 8. Bit positions 6–3 hold a division factor for dividing down the master clock in Time Base circuit 112 to generate the peripheral clock. Bit positions 2–0 contain flag values for each of the three counters in Spindle Counter circuit 111. Register 9 is reserved as a test word storage position.

Register A stores spindle control information for circuit portions 108–111. Bit positions 15–14 contain multiplexer control values for selecting between internal and external spindle counter index inputs, and divided frequency or undivided frequency inputs. Bit positions 13–12 contain counter mode control values for selecting the input and start and stop functions of the relative phase counter of Spindle Counter circuit 111. Bit positions 11–8 contain a divisor value between one and fifteen for dividing the frequency of an input to spindle counter 1. Bit positions 7–5 contain clock selection bits for selecting between two possible clock signals for each counter within Spindle Counter circuit 111. Bit positions 4–3 contain spindle circuit reset and enable bits. Bit position 2 contains a power control bit for disabling power to spindle circuit drive amplifiers. Bit position 1 contains a GAIN control bit for selecting between two possible spindle current amplitude profiles. Bit position 0 stores the ADVANCE bit used by the DSP to control spindle commutation during startup.

Register B stores the twelve-bit digital input value for SPDAC 114 in bits 14–3, with the most significant bit in bit position 14. Registers C and D store fifteen-bit counter values from spindle counters 1 and 2 within Spindle Counter circuit 111. The fifteen-bit counter values are stored in bit positions 14–0 with the most significant bit in position 14. Register E stores the sixteen-bit counter value, including a sign bit, for spindle counter 3. Register F stores a sixteen-bit preload offset value for spindle counter 3. In registers E and F, the sign bit is stored at position 15 with the most significant bit at position 14.

In the above peripheral register example, register 0, bits 0, 3 and 10–13 and register 8, bits 0–3 are peripheral status bits and may be implemented as "read only" registers with respect to the DSP. Similarly, registers 1–5 and C–E represent peripheral outputs that may also be "read-only." Other registers are either peripheral control registers or peripheral input registers into which the DSP may write. The sixteen peripheral registers within PIO REG block 105 must be assigned to sixteen separate address locations in the address space to be uniquely addressable. Typically, however, the peripheral registers are grouped together in consecutive address locations for simplicity.

Peripheral registers are typically located in the processor's address space on a different page than the data memory the microcode program is primarily accessing, i.e. the page or pages wherein the firmware variables reside. Because the peripheral register location is not on the same page as the current data memory used by the program, access to the peripheral register by the processor requires an intermediate data page register or auxiliary register loading operation. For example, a transfer of data from data memory to a peripheral register requires (1) an initial programming or loading of the data page register with the initial data page pointer value for the data memory containing the data value for transfer, (2) a DSP read of the data value, (3) an intermediate programming of the data page register to access the data page containing the peripheral registers, (4) a DSP transfer to the peripheral register, and (5) usually a reloading of the data page register back to the initial data page pointer value. These actions require execution of DSP instructions and therefore lower performance. This type of data transfer method is referred to as "Direct Mode PIO Access."

Figure 2:
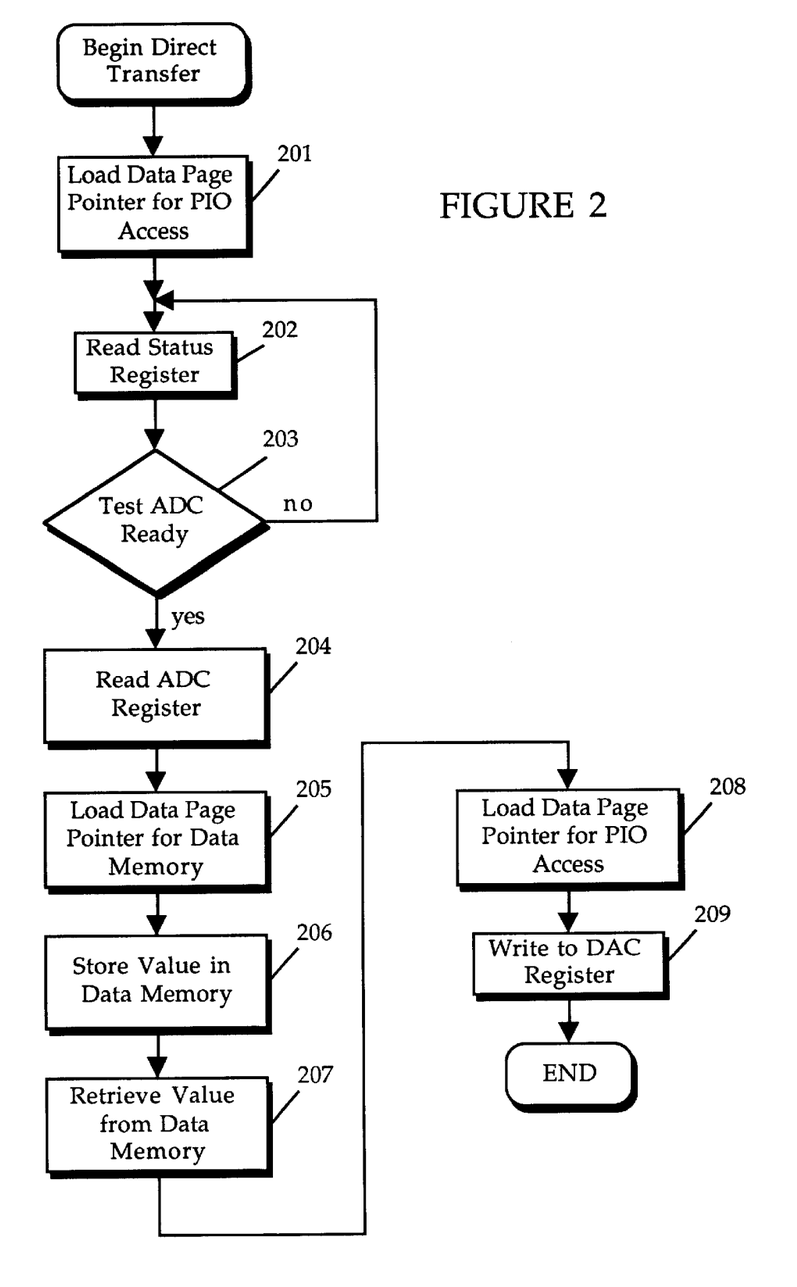
FIG. 2 is a flow diagram of a prior art direct mode data transfer.

FIG. 2 is a flow diagram of an example of a direct mode PIO data transfer between internal data memory and a peripheral. In the example, the operation performed consists of: (1) reading a peripheral status register indicating when an ADC register may be read, (2) reading a peripheral ADC register and copying the register value into internal data memory, and (3) writing an internal data memory value to a DAC register.

The direct mode access begins in block 201 where the data page pointer is loaded into the data page register. This act consists of setting the current data page via the data page pointer in the data page register so that the desired memory locations are accessible. In block 201, the data page pointer value loaded is for that data page containing the location of the PIO register block. In the following block 202, the processor reads the status register.

In block 203, based on the read operation in block 202, a test is performed to determine whether the AD_READY bit (e.g. "ADC3 Done") is set in the PIO status register, indicating that the ADC PIO register contains a valid value. If the AD_READY bit is not set, thereby indicating that the ADC is not yet ready, the operation returns to block 202 and reads the status register again. When the test in block 203 confirms that the AD_READY bit is set, the operation proceeds to block 204 wherein the processor reads the ADC PIO register. Once the ADC PIO register is read, in block 205, the data page pointer is reloaded in the data page register so that the internal data memory is once again accessible. In block 206, the ADC value is stored in data memory in the selected page.

In block 207, the processor retrieves a value from data memory for loading into a DAC. To access the DAC PIO register, in block 208, the data page register is loaded with the data page pointer value for the page containing the PIO register block. In block 209, the processor writes the retrieved value into the DAC PIO register.

As illustrated in FIG. 2, in direct mode, the PIO register block must first be made accessible by setting the data page pointer in the data page register. Once the ADC is read, the data page register containing the data page pointer must be reloaded so that the internal data memory is accessible. One drawback to direct mode transfer operations is that the data page register must be frequently reloaded to switch between internal data memory and PIO register space.

An assembly code fragment implementing the direct mode operation discussed in FIG. 2 follows. The assembly instructions are consistent with the instruction set of a TMS32C025™ code compatible DSP.

```
DIRECT_MODE:
    LDPK PIO_DATA_PAGE      ;Load data page pointer for PIO
TEST_AD:
    BIT STATUS,15-AD_READY  ;Read status register
    BBZ TEST_AD             ;Test bit AD_READY
    LAC AD_REG,0            ;Read ADC register
    LDPK SERVO_DATA_PAGE    ;Load data page pointer for
                            ;servo data memory
    SACL AD_VALUE           ;Store value in data memory
    LAC DA_VALUE,0          ;Retrieve value from data
                            ;memory
    LDPK PIO_DATA_PAGE      ;Load pointer to DAC PIO register
    SACL DA_REG             ;Write DAC register
```

As illustrated above, nine instructions are required to accomplish the example operation using direct mode PIO access.

Some DSPs offer auxiliary registers to assist in page addressing by preloading a specified auxiliary register pointer and making use of "next auxiliary pointer" instruction code operands in what is called "Indirect Mode PIO Access." However, when auxiliary registers (ARs) are used to hold the peripheral address, one of the special purpose auxiliary registers must be dedicated. When multiple peripherals exist, each requires a separate AR. Since there are only a few ARs, dedicating them is not possible, and, therefore, direct page loading is necessary.

Figure 3:
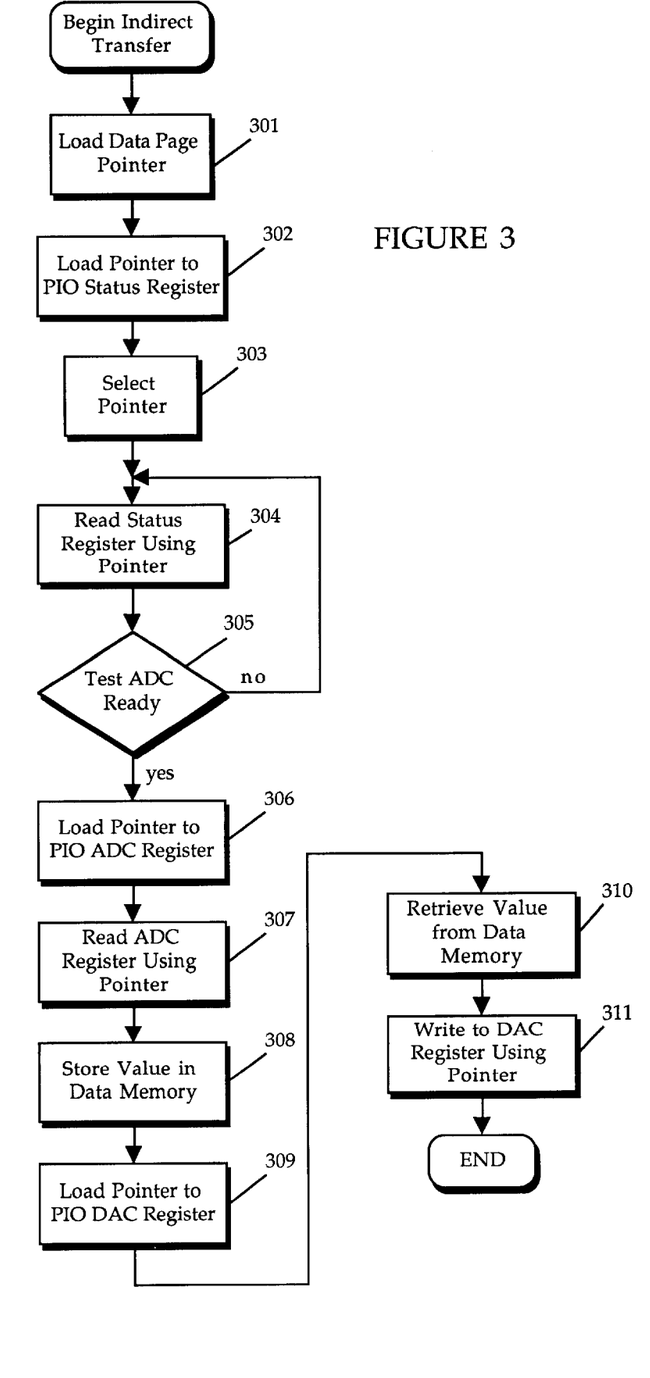
FIG. 3 is a flow diagram of a prior art indirect mode data transfer.

FIG. 3 is a flow diagram of the same example operation of FIG. 2, now implemented with an auxiliary register for indirect mode PIO access. Indirect mode relies upon auxiliary registers that are loaded with the complete address of the addressed peripheral register. In FIG. 3, indirect mode access begins in block 301 wherein the processor loads the data page register with the selected internal memory data page pointer value. In subsequent block 302, the processor loads the auxiliary register with a value that points to the location of the PIO status register. In block 303, the auxiliary register is selected as the active pointer register since only one may be active at a time. All references to the ADC are considered indirect because references to the ADC do not directly call out the address to the ADC. Instead, references to the ADC call out an auxiliary register which is then read to provide the address. After the pointer has been selected, in block 304, the processor reads the status register by means of the pointer.

A test of the status bit is made in block 305 to determine if the ADC is ready. If the ADC is not ready, the process returns to block 304 to read the status register via the pointer again. If the ADC is ready, as determined by the test in block 305, the auxiliary register is loaded in block 306 with the pointer value for the ADC PIO register. In block 307, the processor reads the ADC PIO register using the pointer stored in the auxiliary register. Then, in block 308, the processor stores the ADC value into the internal data memory using the data page pointer specified in block 301.

In block 309, the processor loads the auxiliary register with the pointer value for the DAC PIO register. In block 310, the processor retrieves the data memory value from internal data memory using the data page pointer. In subsequent block 311, the processor writes the retrieved value into the DAC PIO register using the pointer value in the auxiliary register.

Indirect mode has the disadvantage of requiring each PIO register address to be loaded by an extra instruction into an auxiliary register prior to access. Though the DSP provides simple means for incrementing or decrementing the auxiliary register pointer content after an access operation, these pointer operations are intended for accessing arrays of memory. Peripheral registers are typically special functions and it is rare that successive PIO accesses can take advantage of simple post increment or decrement operators.

An assembly code fragment implementing the indirect mode operation discussed in FIG. 3 follows.

```
INDIRECT_MODE:
    LDPK SERVO_DATA_PAGE   ;Load data page pointer to servo
                           ;data memory
    LARK AR7,AD_STATUS     ;Load pointer to PIO status
                           ;register
    LARP AR7               ;Select pointer
TEST_AD:
    BIT *,15-AD_READY      ;Read status register using
                           ;pointer
    BBZ TEST_AD            ;Test bit AD_READY
    LARK AR7,AD_REG        ;Load pointer to ADC PIO register
    LAC *,0                ;Read ADC register using pointer
    SACL AD_VALUE          ;Store value in data memory
    LARK AR7,DA_REG        ;Load pointer to DAC PIO register
    LAC DA_VALUE,0         ;Retrieve value from data
                           ;memory
    SACL *                 ;Write to DAC PIO register using
                           ;pointer
```

As shown above, eleven instructions are required to accomplish the example operation using indirect mode PIO access.

SUMMARY OF THE INVENTION

The present invention is a method and apparatus for providing relocatable overlaid peripheral paging. The present invention provides improved and flexible peripheral register access for microprocessor-based applications such as digital signal processing systems which implement paged data addressing. Unnecessary page selection is eliminated to enhance processing speed and to provide peripheral addressing flexibility. The present invention also provides a performance improvement by allowing peripheral registers to share the same page as data. When the peripheral register shares the same page as data, intermediate data page pointer loading (direct or indirect through auxiliary registers) is unnecessary. Therefore, the microprocessor instructions necessary to transfer data between data memory and peripherals are reduced. Due to the reduction in the number of instructions required for data transfer, the processor runs more efficiently and consumes less program memory.

The present invention provides a means of flexibly locating the data page assigned to the peripheral registers. External hardware contentions are eliminated because the peripheral registers can be relocated anywhere in the system address space. Hardware design is therefore much more flexible. Further, because the present invention allows peripheral registers to overlay internal data memory, data transfers can be carried out between data memory and peripherals using the same data page pointer. No intermediate pointer loading operations are required and memory operations to the peripheral registers can be carried out at maximum speed.

The present invention allows peripheral registers to overlay data memory in a manner that permits the overlaid memory to be recovered and used for other purposes. Processor program code can be designed to overlay internal data memory with a peripheral register while performing data transfers between the data memory and the peripheral register. The overlaid data memory is not accessible while it is overlaid. Then, after completing transfers, the peripheral register can be relocated elsewhere so that the underlying internal data memory is recovered. The underlying data memory is not disturbed when writing to the overlaying peripheral register.

The present invention offers considerable advantages, high levels of integration, and is an effective solution to supporting large numbers of peripheral registers.

DETAILED DESCRIPTION OF THE INVENTION

The present invention is a method and apparatus for providing relocatable overlaid peripheral paging. In the following description, numerous specific details, such as word length and page size, are set forth to provide a more thorough description of the present invention. It will be apparent, however, to one skilled in the art, that the present invention may be practiced without these specific details. In other instances, well known features have not been described in detail so as not to obscure the present invention.

In the prior art, peripheral registers are permanently assigned to specific address locations within a system's address space. This permanent assignment is inflexible. As a result, data transfers between the DSP and peripherals require multiple data page loads to access the separate pages of memory containing the data to be transferred and the data page or pages containing the peripheral registers. Further, when peripheral registers are assigned addresses within the data memory partition, valuable data memory address space is lost.

The present invention provides a separate peripheral page register that contains a variable peripheral page address value. A peripheral register, or a peripheral register block containing multiple registers, is able to occupy data memory space without permanent loss of data memory space. The address space is reclaimed by assigning the peripheral register or peripheral register block to a new data page. Further, the peripheral register block may be assigned to a data memory page containing firmware variables that most often interface with the peripheral registers. The number of instances requiring data page loading operations is substantially reduced.

Figure 6:
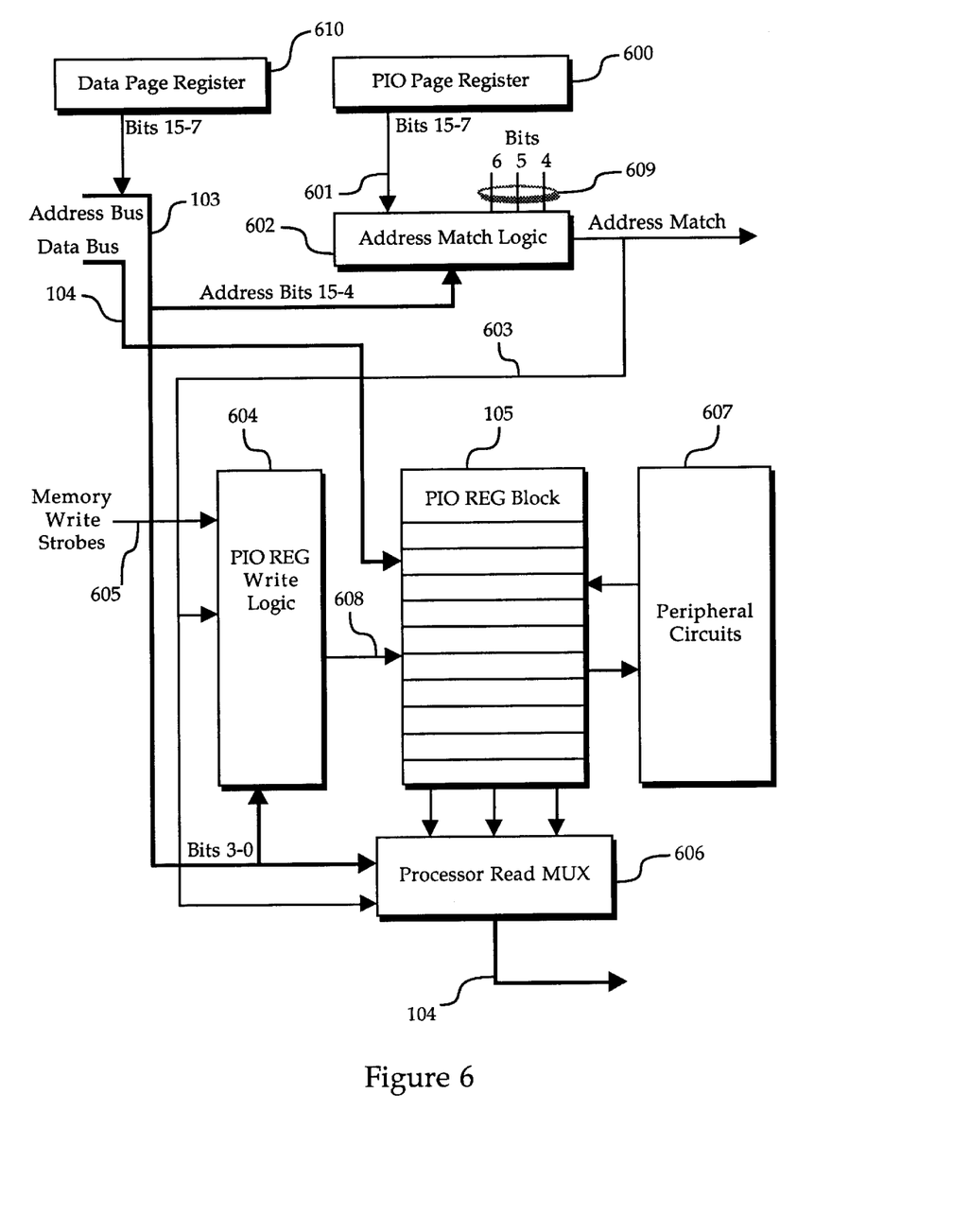
FIG. 6 is a circuit block diagram of an embodiment of the relocatable overlaid peripheral paging apparatus of the present invention.

FIG. 6 shows one embodiment of a peripheral I/O (PIO) page register and PIO register block of the present invention. As shown in FIG. 6, PIO page register 600 is provided for storing the page value for peripheral register (PIO REG) block 105 that contains peripheral registers for one or more peripheral circuits 607. For the example circuit of FIG. 1, PIO page register 600 is nine bits wide to accommodate the nine most significant bits of a sixteen-bit address word. When the peripherals are accessed, masking logic disables access to the underlying data memory and enables access to PIO REG block 105. This masking prevents corruption of the underlying data memory during peripheral access operations by the processor.

In FIG. 6, PIO page register 600 stores the current page value of the data page containing PIO REG block 105. This page value is stored as the upper nine bits (i.e. bits 15–7) of the sixteen-bit address word and is provided to address match logic 602 via bus 601. Three bit lines (609) representing bits 6–4 of the PIO register block address are coupled between logic 602 and a logical "1". This coupling of bit lines 609 has the effect of placing the PIO REG block 105 at the top of the page to which it is assigned. Other "hardwired" values may be similarly applied to bit lines 609, resulting in a positional shift of the PIO REG block within the page.

Bits 15–4 of address bus 103 are also provided to match logic 602 for comparison with the address value provided by bus 601 and bit lines 609. Bits 15–7 of bus 103 carry the current data page value stored in Data Page Register 610. Address match logic 602 outputs Address Match signal 603, which is provided to PIO REG write logic 604 and processor read multiplexer 606, for enabling purposes, and to a strobe masking circuit (not shown) for disabling read and write strobes to underlying memory. Bits 3–0 of address bus 103 are provided to write logic 604 and multiplexer 606 for selecting from among the sixteen registers provided in this embodiment of the PIO REG block 105. PIO REG block 105 is coupled to peripheral circuits 607 in a manner that allows the peripheral circuits to directly access PIO REG block 105 for writing to dedicated registers as well as allowing continuous reading from the dedicated registers.

During a write operation, when a match is indicated by Address Match Signal 603, write logic 604 enables a selected register in PIO REG block 105 through enable lines 608. The selected register loads the value from data bus 104 when memory write strobe 605 provided to logic 604 is pulsed. During a read operation, when a match is indicated by Address Match Signal 603, multiplexer 606 provides the appropriate PIO register value to data bus 104. During both read and write operations, the underlying memory address is disabled from providing a value to the data bus, or reading a value from the data bus, by Address Match signal 603. An AND gate, with the read or write strobe as one input and an inverted Address Match signal as a second input, is one example apparatus for masking the underlying memory. The Address Match Logic 602 may perform bit-wise XNOR operations followed by a collective twelve bit AND operation on the XNOR outputs, or other address matching procedure known in the art.

With the apparatus of the present invention, the peripheral register block may be located anywhere within the processor's address space. Only the PIO page register need have a fixed address. For example, the PIO page register may be assigned to page zero of the data memory. Because the PIO REG block can be located anywhere, it can overlay internal data memory space, exploiting the advantages provided by data memory transfer over transfers involving I/O space.

The apparatus of the present invention can be used with large numbers of peripheral registers. In the case where the number of peripheral registers contained in the PIO register block is such that the size of the PIO register block approaches or exceeds the size of a data page, the peripheral registers may be grouped into separate peripheral register blocks, for example, by function or other suitable feature, and provided with a peripheral page register for each group. Each such peripheral register block is separately relocatable within the system address space. Thus, large systems with many peripherals can be accommodated.

In an alternate embodiment of the present invention, the peripheral register block is allowed to be located in a reduced number of page locations determined by the number of bits in the PIO page register. Those page value bits not provided in the PIO page register are fixed to a specific value, in a manner similar to the manner that bit values are fixed by bit lines 609 in FIG. 6. In such an alternate design, the flexibility in locating a peripheral register block is reduced as a trade off for fewer control bits. Conversely, fewer bit values may be fixed and the PIO page register may be extended to provide greater relocatability within the data page at the expense of more control bits.

Figure 4:
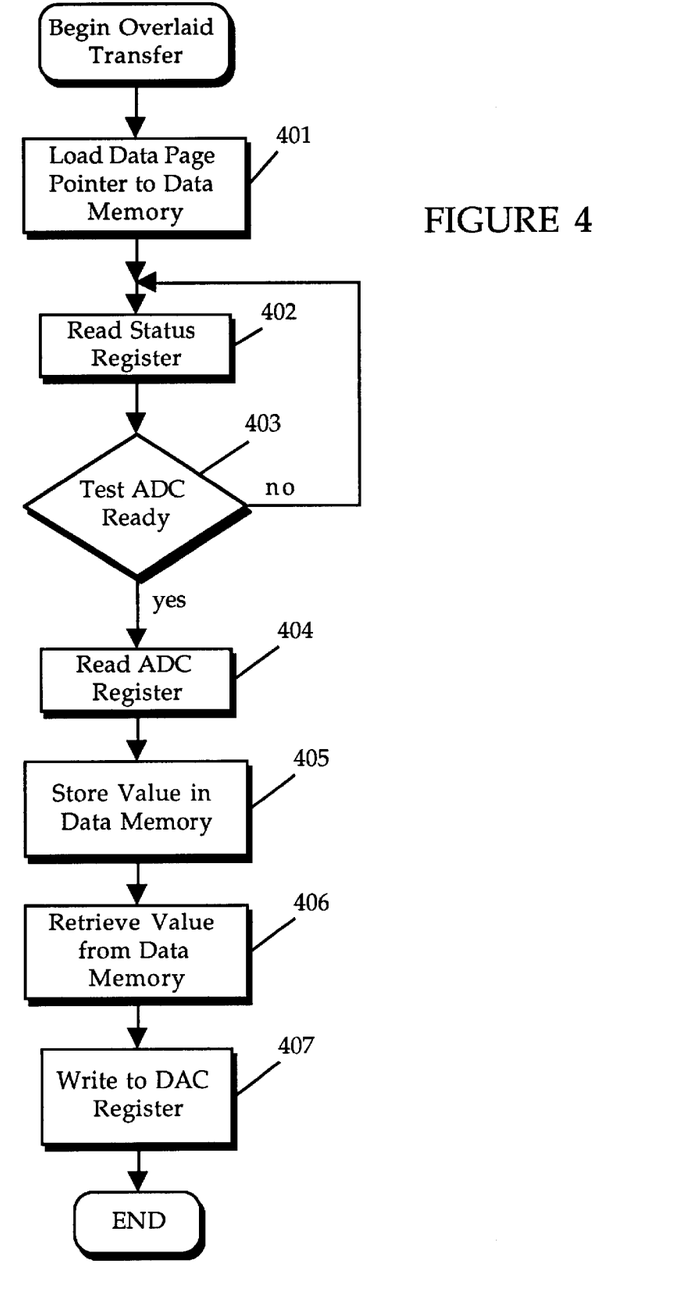
FIG. 4 is a flow diagram of a direct mode data transfer utilizing an embodiment of the present invention.

FIG. 4 is a flow diagram of the example data transfer operation of FIGS. 2 and 3 as performed in an embodiment of the present invention using direct mode access with overlaid peripheral paging. Successive transfers of data between peripheral registers and other locations on the same data page require only an initial loading of the PIO page register with the desired data page value. Subsequent data transfers on the same data page can then proceed without reprogramming the PIO page register, as shown in FIG. 4.

In block 401 of FIG. 4, the data page pointer is loaded into the data page register to provide access to the chosen data page. As explained above, the PIO REG block is already located on the selected data page. Thus, only the data page register is loaded in this example. After block 401, in block 402, the PIO status register for the ADC is read to ascertain the state of the AD_READY bit. In block 403, the determination of the ADC status is made based upon the state of AD_READY as read in block 402. If the status is bit indicates the ADC is not ready, the operation returns to block 402 to read the status register again. If the status bit indicates the ADC is ready, then, in block 404, the processor reads the ADC value from the PIO ADC register. The processor is then able to store the ADC value directly into data memory in block 405 without any further page register loading. In block 406, the processor retrieves a data memory value from data memory, and, in subsequent block 407, writes the data memory value to the PIO DAC register.

As illustrated in FIG. 4, the present invention requires no intermediate page register loading operations to access PIO registers since the PIO register block is on the same page as the data. The reduction in CPU instruction overhead is clear from the following assembly code fragment implementing the direct mode operation in a system utilizing the present invention. The present invention is consistent with existing microcode of popular processing devices such as the TMS32C025™ DSP.

```
OVERLAID_MODE:
    LDPK SERVO_DATA_PAGE   ;Load data page pointer to data
                           ;memory (and overlaid PIO)
TEST_AD:
    BIT STATUS,15-AD_READY ;Read status register
    BBZ TEST_AD            ;Test bit AD_READY
    LAC AD_REG,0           ;Read ADC register
    SACL AD_VALUE          ;Store value in data memory
    LAC DA_VALUE,0         ;Retrieve value from data
                           ;memory
    SACL DA_REG            ;Write DAC register
```

With overlaid peripheral paging, fewer instructions are necessary when transferring data between internal data memory and peripherals. For the examples given with respect to FIGS. 2–4, the overlaid peripheral paging example requires two fewer instructions than the direct mode prior art example, and four fewer instructions than the indirect mode prior art example.

The ability to relocate a peripheral register block allows the data memory to be overlaid. For example, the peripheral register block can be assigned address space which shares the same data page as servo variables in data memory. The following code relocates the PIO register block to overlay data memory on a servo data memory page.

```
LDPK PIO_PAGEREG       ;Access page of PIO page register
LALK SERVO_DATA_PAGE   ;Data memory page of servo variables
                       ;where PIO registers will be overlaid
SACL PIO_PAGEREG       ;Write to PIO page register
```

Because the peripheral register block is relocatable, the PIO page register may be reprogrammed at anytime to specify a different peripheral register block location. Reprogramming the PIO page register allows the data memory overlaid by the PIO register block to become accessible. The following code shows how to relocate the PIO register block to a new location, such as to external data memory address space, so that the servo data memory overlaid by the PIO register block is again accessible.

```
LDPK PIO_PAGEREG       ;Access page of PIO page register
LALK EXT_DATA_PAGE     ;Page for PIO in external memory
SACL PIO_PAGEREG       ;Write to PIO page register
```

The above embodiments are described with respect to a paged DSP system in a servo application. It will be obvious to one skilled in the art that the present invention can be similarly applied to other paged memory applications.

Thus, a method and apparatus for providing relocatable overlaid peripheral paging has been described.

What is claimed is:

1. The apparatus comprising:
   a microprocessor utilizing paged data addressing wherein a system address space is partitioned into a plurality of data pages;
   a memory of a first type, said memory being coupled to said microprocessor;
   a register having a first page value, said first page value indicating a first data page of said plurality of said data pages that is currently accessible by said microprocessor;
   a memory block relocatable among said plurality of said data pages, said memory block having a size not larger than a size of one of said data pages;
   a peripheral register for a peripheral circuit having a second page value, said second page value indicating a current data page of said plurality of data pages, said memory block being located on said current data page.

2. The apparatus of claim 1 further comprising an address matching circuit coupled to an address bus and said second register, said address matching circuit providing a first signal indicating an address match.

3. The apparatus of claim 2 further comprising a masking circuit coupled to said address matching circuit, said address masking circuit disabling access said current data page that is currently accessible by said microprocessor when said first signal is provided.

4. The apparatus of claim 1 wherein said memory block is coupled to at least one peripheral, said memory block providing a register interface between said at least one peripheral and said microprocessor.

5. The apparatus of claim 1 wherein said memory block is smaller in size than a size of said data page on which said memory block is located, and wherein said peripheral register further comprises at least one bit for controlling a position of said memory block within said data page partition.

6. The apparatus of claim 2, wherein said address matching circuit is further coupled to at least one hardwired bit for controlling a position of said memory block within said data page.

7. The apparatus of claim 1 wherein said memory of said first type is data memory.

8. The apparatus of claim 1 wherein said register and said peripheral register first and second registers comprise internal memory words within said microprocessor.

9. A method for providing relocatable overlaid paging in a system comprising a microprocessor, a memory of a first type and a memory block, said method comprising the steps of:
   partitioning a memory address space into a plurality of data pages, said memory of said first type occupying at least on page of said plurality of data pages;
   providing a first page value in a register to indicate a first data page of said plurality of data pages accessible by said microprocessor;
   providing a second page value in a peripheral register for a peripheral circuit to indicate a current data page of said plurality of data pages, said memory block currently residing on said current data page, said first and second page values being selectable by said processor.

10. The method of claim 9 wherein said memory of a first type is data memory.

11. The method of claim 9 wherein said memory block overlays a portion of said memory of said first type.

12. The method of claim 11 further comprising the step of disabling access to said current data page when said memory block is addressed by said microprocessor.

13. The method of claim 12 further comprising the additional step of changing said second page value to relocate said memory block and to allow access to said current data page.

14. The method of claim 9 wherein said microprocessor interfaces with at least one peripheral through said memory block.

15. An apparatus comprising:
   a microprocessor utilizing paged data addressing wherein a system address space is partitioned into a plurality of data pages;

at least one peripheral;

a peripheral register coupled to said microprocessor and said peripheral, said peripheral register providing an interface between said microprocessor and said peripheral;

a data page register coupled to said microprocessor, said data page register having a data page value of a current data page accessible by said microprocessor;

a peripheral page register coupled to an address bus, said peripheral page register including a changeable page value to indicate said current data page on which said peripheral register is located.

16. The apparatus of claim 15 further comprising data memory partitioned into said plurality of data pages.

17. The apparatus of claim 16 further comprising a masking circuit coupled to said peripheral page register, said masking circuit disabling access to a portion of said data memory located on a same data page as said peripheral register.

18. The apparatus of claim 15 wherein said microprocessor is a digital signal processor.

19. The apparatus of claim 15 comprising a plurality of peripherals and a peripheral register block containing a plurality of peripheral registers for said plurality of peripherals.

* * * * *

UNITED STATES PATENT AND TRADEMARK OFFICE
CERTIFICATE OF CORRECTION

PATENT NO. : 6,578,123 B1
DATED : June 10, 2003
INVENTOR(S) : Charles C. Austin et al.

It is certified that error appears in the above-identified patent and that said Letters Patent is hereby corrected as shown below:

<u>Title page,</u>
Item [54], please replace the title as follows:
-- RELOCATABLE OVERLAID PERIPHERAL PAGING --

Signed and Sealed this

Seventh Day of October, 2003

JAMES E. ROGAN
*Director of the United States Patent and Trademark Office*